United States Patent [19]
Zaborsky

[11] 3,830,699
[45] Aug. 20, 1974

[54] INSOLUBILIZED ENZYMES

[75] Inventor: Oskar R. Zaborsky, Watchung, N.J.

[73] Assignee: Esso Research and Engineering Company, Linden, N.J.

[22] Filed: Mar. 16, 1972

[21] Appl. No.: 235,437

[52] U.S. Cl............... 195/63, 195/68, 195/DIG. 11
[51] Int. Cl.............................................. C07g 7/02
[58] Field of Search................. 195/63, 68, DIG. 11

[56] References Cited
UNITED STATES PATENTS
3,645,852   2/1972   Axen et al. .......................... 195/68
3,705,084   12/1972  Reynolds .............................. 195/63

OTHER PUBLICATIONS
Hits, C. H. W., Methods in Enzymology, Vol. XI, Academic Press, N.Y. 1967 (pp. 595–604) QP601C72.
Weliky, et al., The Chemistry and Use of Cellulose Derivatives For the Study of Biological Systems, Immunochemistry, Vol. 2, 1965 (p. 305).

Primary Examiner—David M. Naff

[57] ABSTRACT

A general process for preparing water-insoluble enzymes which comprises covalently bonding said enzymes to an insoluble polymer, said bonding taking place by the reaction of imidoester functional groups on said polymer with enzyme amino groups. The polymer is preferably an acrylonitrile-based polymer wherein at least a substantial portion of the surface acrylonitrile groups are converted into imidoesters by contacting with an alcohol and a hydrogen halide (e.g., HCl) to form imidoester functional groups. Said imidoester functional groups are then contacted with an aqueous enzyme-containing solution at reaction conditions whereby an insoluble enzyme composite is formed. Said insoluble enzyme composite retains activity substantially equivalent to the enzyme in its native state and further shows increased resistance to degradation by heat as well as chemical denaturants.

18 Claims, No Drawings

INSOLUBILIZED ENZYMES

FIELD OF THE INVENTION

A general process for preparing water-insoluble enzymes which comprises covalently bonding said enzymes to an insoluble polymer, said bonding taking place by the reaction of imidoester functional groups on said polymer with enzyme amino groups. The polymer is preferably an acrylonitrile-based polymer wherein at least a substantial portion of the surface acrylonitrile groups are converted into imidoesters by contacting with an alcohol and a hydrogen halide (e.g., HCl) to form imidoester functional groups. Said imidoester functional groups are then contacted with an aqueous enzyme-containing solution at reaction conditions whereby an insoluble enzyme composite is formed. Said insoluble enzyme composite retains activity substantially equivalent to the enzyme in its native state and further shows increased resistance to degradation by heat as well as chemical denaturants.

BACKGROUND OF THE PRIOR ART

Enzymes are known to be the most active and selective catalysts known. They have been used in food processing, and in chemical and pharmaceutical industries to achieve conversions that are difficult to obtain in the absence of enzymes. There is, however, a known difficulty in separating enzymes from the reaction products with which it is in contact. It would be very desirable to be able to separate enzymes for reuse, but because of the expense involved, the usual application leaves the enzyme in the finished product. Recent efforts have been directed toward the insolubilization of enzymes on insoluble solids such as kaolinite, acid clay, calcium phosphate gel, montmorillonite, cellulose derivatives, organic ion-exchange resins, polyacrylamide gels, cellophane, filter paper, nylon, etc. Enzymes are attached to the aforementioned solids via adsorption, ion-exchange, physical entrapment, and/or chemical attachment.

In U.S. Pat. No. 3,519,538, Messing teaches covalently bonding enzymes to glass by the use of silane coupling agents. This process suffers from economic disadvantages as the silane coupling agents are in general very expensive. Also, it is known in the art that glass is slightly soluble in alkaline solutions; thus utilization of these systems at a pH greater than 7 is undesirable, especially when the enzyme composite will be continuously reused. Further, because of the irreversible nature of the enzyme-glass attachment, the enzyme cannot be removed without destroying its catalytic function.

Ludwig and Hunter, Meth. in Enzymol, II, 595 (1967) disclose that proteins can be modified by reaction with monofunctional imidoesters. The reaction of said imidoester with the protein is shown to take place at the amino groups of the protein. In the one example wherein the authors produced an insoluble product, it was reported to be grossly denatured, i.e. inactive.

Tazuke, Hayashi and Okamura, Chem. High Polymers, Japan, 22, No. 240, 259–263 (1965) show that the nitrile groups in polyacrylonitrile and copolymers thereof can be reacted with an alcohol and hydrogen halide (e.g. chloride) to yield imidate ester functional groups. The authors used this technique to modify the surface of polyacrylonitrile fibers to improve the dyeability and static properties of said fibers.

SUMMARY OF THE INVENTION

It has now been unexpectedly discovered that enzymes may be conveniently insolubilized by contacting said enzymes with an insoluble polymer containing imidate ester functional groups, at conditions whereby the enzyme reacts with said insoluble polymer, at the imidate ester functional group, to form an enzyme composite, wherein said enzyme is covalently bound to said insoluble polymer. Contacting is preferably done in an aqueous solution wherein said enzyme is solubilized and said polymer exists as an insoluble phase. Preferably, the pH of the aqueous solution is adjusted to be at least 7, preferably 9–10.5, in order to promote the reaction of the enzyme with the polymer. The pH can be conveniently adjusted with any basic compound or buffer, but preferably sodium and potassium hydroxide will be utilized. The reaction takes place between the imidate ester functional groups and one or more of the amino functional groups on said enzyme to produce an amidine structure. This procedure is a general one and may be utilized to insolubilize all types of enzymes provided that said enzymes contain at least some amino groups. The reaction, in general, takes place at the primary amine functional groups of the enzyme, but secondary amino groups will also react, although at a slower rate.

The reaction of the enzyme with the imidate ester containing polymer takes place at a temperature of from about 0° to 100°C., preferably from 15° to 50°C. Since the reaction is facile, room temperature is conveniently used.

The polymers which may be utilized for insolubilizing enzymes are conveniently prepared by reacting an acrylonitrile containing polymer with alcohol and HCl, to produce the imidate ester thereof. This reaction is carried out under anhydrous conditions since $H_2O$ will destroy the imido ester formed. The reaction of the acrylonitrile containing polymer with alcohol and HCl is usually run at a temperature of from −50°C. to +100°C., preferably at from −25° to +75°C. Polymers which are useful precursors of the imidate ester containing polymer utilized in the instant process are selected from the group consisting of acrylonitrile containing polymers, i.e., acrylonitrile homopolymers, acrylonitrile vinyl acetate copolymers, acrylonitrile vinyl chloride copolymers, acrylonitrile acrylate copolymers, etc. Preferably, the acrylonitrile monomer content of said polymers will be at least 25 percent by weight and more preferably from 50 to 100 percent by weight of the total polymer.

The acrylonitrile polymer which is utilized to form the imidate ester may be in the form of sheets, powders, fibers, etc. Alternately, the enzyme can be bound to the imidate ester prior to the conversion of the composite into the desired physical form.

In general the enzyme can be bound to any physical form of the acrylonitrile polymer depending on the use of said enzyme. In processes where said enzyme will be utilized as a catalyzt, the form will be chosen so as to obtain maximum process efficiency. For example, the enzyme may be bound to an acrylonitrile fiber and said fiber woven into a cloth. Catalysts in this form will thus provide adequate contact with the reactants of the solution so as to obtain maximum reaction rates and also may be easily removed by removal of the cloth.

The enzyme can be covalently bound to an acrylonitrile derivative in the form of a powder. In this manner the surface area of the enzyme can be varied so as to obtain the desired reaction rates. The powder may be utilized by suspending said powder in a reactant bath in a batch process and easily separated by filtering, sedimentation, etc.

Alternately, the enzyme-composite may be utilized in column operations, wherein the feedstream is flowed through a column of said composite, in powder form, at reaction conditions, whereby a continuous enzymatic conversion is obtained.

A specific process for utilizing the enzymecomposites of the instant invention takes advantage of the desirable characteristics of hollow fiber reactors. Hollow fibers of acrylonitrile polymers are converted to the imido ester derivative by use of the process described above. The selected enzyme is then insolubilized on said hollow fiber in the standard manner. The instant novel hollow fiber may then be utilized for simultaneously reacting and separating components of a feed stream. The enzyme may be conveniently attached at either the interior or exterior surface of the hollow fiber.

As stated previously, this process is a very general one. Enzymes which may be immobilized by use of the process of the instant invention include a wide variety of enzymes which may be classified under six general headings: hydrolases, oxidoreductases, transferases, lyases, isomerases and ligases. The preferred enzymes are the hydrolases, including proteolytic enzymes which hydrolyze proteins, e.g., papain, ficin, pepsin, trypsin, chymotrypsin, bromelin, keratinase; carbohydrases which hydrolyze carbohydrates, e.g., cellulase, amylase, maltase, pectinase, chitinase; esterases which hydrolyze esters, e.g., lipase, cholinesterase, lecithinase, alkaline and acid phosphatases; nucleases which hydrolyze nucleic acid, e.g., ribonuclease, desoxyribonuclease; and amidases which hydrolyze amides, e.g., arginase, aspariginase, glutaminase, and urease; and the oxidoreductases including glucose oxidase, catalase, peroxidase, lipoxidase, and cytochrome reductase.

A further advantage of the enzyme composites of the instant invention is that increased stability to heat and denaturants, as compared to the enzyme in its native state, is obtained. It is known in the art that enzymes must maintain very specific configurations in order to function efficiently. These configurations may be substantially changed by small changes in temperature and in the nature of the solution in which the enzyme is solubilized. For example, a high concentration of methanol acts to denature many enzymes. While not wishing to be bound by any theory, it is felt that in the instand process, binding the enzyme to an insoluble polymer hinders changes in conformation by heat and various solvents. The process of the instant invention also allows the preparation of enzymes which are increasingly stable to other denaturing agents. For example, sensitivity of the instant enzyme composites to extreme pH changes, high ionic strength, urea, guanidine, and lyophilization, is decreased as compared to the enzymes in their native state.

The increased stability of lyophilization of the enzyme composites of the instant invention is especially surprising, since it is known that many of the same enzymes bound to glass have decreased stability.

The enzymes utilized in the instant process may be covalently bound to the insoluble polymer at more than one position, thus further stabilizing the conformational structure of enzyme toward heat, solvents and other denaturants.

More particularly, the insoluble enzymes of the instant invention are produced by reacting the insoluble polymers as described above with hydrogen halide and alcohol. Preferably, the alcohol is methanol or ethanol and the hydrogen halide is HCl. The reaction of the nitrile group with alcohol and HCl takes place most readily at the surface of the polymer, but it is apparent to the skilled artisan that in both the derivatization step (formation of imidate ester) and the subsequent enzyme coupling step specific solvents or specific polymers can be utilized so as to increase the concentration of both imidate ester functional groups and the subsequently bound enzyme. For example, acrylonitrile homopolymers are known in the art to be very highly crystalline and thus very difficult to convert to imidate ester except at the surface of the polymer. Solvents can be chosen which destroy the crystallinity of the polymer and thus allow the alcohol and HCl to penetrate into the interior of the polymer and convert interior nitrile groups into imidate ester. A preferred way, however, to obtain higher concentrations of imidate ester functional groups is to copolymerize monomers such as octylacrylate, hexylacrylate, dioctyl maleate, etc. which have the effect of decreasing the crystallinity of the acrylonitrile polymer and thus facilitating the conversion of a greater proportion of the nitrile groups of the polymer into imidate ester groups. The copolymerization method of increasing the imidate ester group concentration is also preferred because in the subsequent enzyme coupling step the solvents which can be used to destroy the crystallinity of acrylonitrile polymers and allow penetration of enzyme into the interior of the polymer will also adversely affect the enzyme itself. Thus it is preferable to increase concentration of functional groups in the polymer by copolymerization of a crystallinity destroying monomer with acrylonitrile rather than using solvents.

The process of the instant invention also allows the skilled artisan to design and insolubilize enzymes wherein various functional groups, i.e., other than enzyme functional groups, are in proximity to the functional groups of the enzyme; that is, various comonomers containing carboxyl, hydroxyl, carboxyl, alkyl, aryl, etc. groups can be copolymerized with acrylonitrile to provide reaction sites, adjacent to the covalently bound enzyme. Thus, the catalytic properties of said enzymes can be modified in novel ways. The acrylonitrile polymers, of course, can be derivatized by various chemical methods to give amide, carboxylic and ester groups prior to the conversion to imidoester subsequent coupling with the enzyme. It is, of ester and subsequent coupling with the enzyme. It is, of course, also possible to derivatize excess nitrile groups, after the enzyme bonding step.

The following are specific embodiments of the instant invention. However, the scope of the instant invention is not intended to be limited thereto since many variations will be obvious to the skilled artisan.

EXAMPLE 1

Preparation of the Imidoester of Polyacrylonitrile

To a cooled (−10° to +5°C.) and magnetically stirred suspension of 10 g. polyacrylonitrile powder in 100 ml. dry methanol was added sufficient hydrogen chloride gas until complete saturation had occurred. The mixture, protected from moisture with a drying tube, was slowly allowed to come to room temperature, and then stirred for 2.5 days.

The modified polyacrylonitrile powder was then filtered, washed thoroughly with cool ether, and vacuum dried over a desiccant (potassium hydroxide flakes). Degree of imidoester formation was determined by infrared spectroscopy, alkaline titration or soluble chloride analysis. The above preparation gave 4% by weight imidoester groups.

EXAMPLE 2

Immobilization of α-chymotrypsin 50 milligrams of the imidoester containing polymer of Example 1 was added to an aqueous solution of α-chymotrypsin (50 milligrams of enzyme in 5 milliliters water). The pH of enzyme solution was adjusted at 10 by titration with 1 normal NaOH in water, prior to the addition of the polymer. During the reaction of the enzyme and the polymer the pH was maintained at 10 by the addition of further aliquots of the sodium hydroxide solution. The reaction was continued for one hour at room temperature under a nitrogen atmosphere. The reaction mixture was then filtered through a millipore filtration unit (RAWP filter; 1.2 microns; 25 millimiters) to separate out the insolubilized enzyme. The insolubilized enzyme was washed with distilled water until the filtrate showed no more enzymatic activity [standard BTEE assay, see B.C.N. Hummel, *Can. J. Physiol.*, 37, 1393 (1959)]. The insolubilized enzyme was evaluated for enzymatic activity and compared to the enzyme in its natural state, i.e., in aqueous solution. The insolubilized enzyme retained full enzymatic activity. Specific activity of insolubilized and free enzymes was 58 and 47 units/mg, respectively.

EXAMPLE 3

The procedure of Example 2 was repeated except that trypsin was substituted for alpha-chymotrypsin. The results were substantially similar, i.e., and insolubilized enzyme was isolated. Said enzyme had an activity of 261 units/mg as opposed to 210 units/mg for the enzyme in its native state. [See B.C.N. Hummel, *Can. J. Physiol.*, 37 1393 (1959), assay with p-toluenesulfonyl-L-arginine methyl ester.]

EXAMPLE 4

The procedure of Example 2 was repeated except that phenolase was substituted for alpha-chymotrypsin. The results were substantially similar, i.e., an insolubilized enzyme was isolated. Said enzyme had an activity substantially similar to the enzyme in its native state.

EXAMPLE 5

The procedure of Example 2 was repeated except that ribonuclease was substituted for alpha-chymotrypsin. The results were substantially similar, i.e., an insolubilized enzyme was isolated. Said enzyme had an activity substantially similar to the enzyme in its native state.

EXAMPLE 6

Thermal Stability of the Insolubilized Enzymes

An appropriate amount of the imidoester-enzyme composite, suspended in buffer,* was incubated in a test tube at the indicated temperature. Aliquots were withdrawn at appropriate time intervals and assayed for enzymatic activity. A similar procedure was used for the soluble native enzyme. The exact experiments are illustrated in the following tables.

*(Tris(hydroxymethyl)amino methane hydrochloride, .05 molar.)

It is apparent from the tables that the enzyme composites of the instant invention have increased thermal stability when compared to the soluble native enzyme.

TABLE I – Trypsin

| Incubation Time at 50°C. (hr.) | Activity Remaining (Percent) Insolubilized Enzyme | Activity Remaining (Percent) Soluble, Native Enzyme |
|---|---|---|
| 0 | 100.0 | 100.0 |
| 0.5 | 90.3 | 25.1 |
| 1 | 87.5 | 13.9 |
| 1.5 | 86.3 | 8.0 |
| 2.0 | 85.6 | 4.8 |
| 3.0 | 83.6 | 1.6 |
| 4.0 | — | 0 |
| 6.0 | 80.1 | — |
| 23.0 | 61.7 | — |
| 28.0 | 56.7 | — |

TABLE II

| | Trypsin | |
|---|---|---|
| Incubation Time at 70°C. (min.) | Activity Remaining (Percent) Insolubilized Enzyme | Activity Remaining (Percent) Soluble, Native Enzyme |
| 0 | 100.0 | 100.0 |
| 15 | 43.9 | 26.1 |
| 30 | 47.1 | 10.9 |
| 45 | 43.2 | 7.8 |
| 60 | 41.3 | 8.2 |
| 75 | 40.1 | 5.9 |
| 90 | 38.0 | — |
| 150 | 34.5 | — |
| 180 | 25.4 | — |
| 210 | 24.2 | — |

TABLE III

| | α-chymotrypsin | |
|---|---|---|
| Incubation Time at 50°C. (min.) | Activity Remaining (Percent) Insolubilized Enzyme | Activity Remaining (Percent) Soluble, Native Enzyme |
| 0 | 100.0 | 100.0 |
| 15 | 80.7 | 16.0 |
| 30 | 70.6 | 4.7 |
| 45 | 56.9 | 2.9 |
| 60 | 51.4 | 1.6 |
| 75 | 53.2 | 0.8 |
| 90 | 36.7 | 0 |
| 105 | 36.7 | — |

What is claimed is:

1. A process for preparing an insolubilized enzyme composite which comprises the steps of reacting an acrylonitrile containing polymer with an alcohol and a hydrogen halide at a temperature of from −50°C to 100°C to form imidate ester functional groups, and contacting said polymer containing imidate ester functional groups, with an enzyme at reaction conditions, whereby an insolubilized enzyme is formed.

2. The process of claim 1 wherein said contacting takes place in an aqueous alkaline solution.

3. The process of claim 2 wherein said contacting takes place at a temperature of from 15°C to 50°C.

4. The process of claim 2 wherein said enzyme is selected from the group consisting of the hydrolases and the oxidoreductases.

5. The process of claim 2 wherein said enzyme is α-chymotrypsin.

6. The process of claim 2 wherein said enzyme is trypsin.

7. The process of claim 2 wherein said enzyme is phenolase.

8. The process of claim 2 wherein said enzyme is ribonuclease.

9. The process of claim 2 wherein said polymer is in the form of a fiber.

10. The process of claim 1 wherein said alcohol is selected from the group consisting of methanol and ethanol and the hydrogen halide is hydrogen chloride.

11. The process of claim 10 wherein the acrylonitrile monomer content of said acrylonitrile containing polymer is at least 25 percent by weight.

12. The process of claim 11 wherein said insoluble polymer is reacted with said alcohol and hydrogen halide at a temperature of from −25°C to +75°C.

13. An enzyme composite comprising an enzyme covalently coupled to a polymer, said enzyme being coupled with said polymer through an amidine linkage, said amidine linkage being provided through the reaction of an imidate ester functional group present on said polymer with an amino group present on said enzyme, and said imidate ester functional group being provided through the reaction of an acrylonitrile group present on said polymer with an alcohol.

14. The product of claim 13 wherein said enzyme is α-chymotrypsin.

15. The product of claim 13 wherein said enzyme is trypsin.

16. The product of claim 13 wherein said enzyme is phenolase.

17. The product of claim 13 wherein said enzyme is ribonuclease.

18. The product of claim 13 wherein said enzyme is selected from the group consisting of the hydrolases and the oxidoreductases.

* * * * *